United States Patent
Schwarzkopf et al.

(10) Patent No.: US 11,092,274 B2
(45) Date of Patent: Aug. 17, 2021

(54) PRE-FABRICATED HEATABLE MEDIA LINE AND PRE-FABRICATED HEATING ELEMENT FOR USE IN SAME

(71) Applicant: VOSS AUTOMOTIVE GMBH, Wipperfürth (DE)

(72) Inventors: Otfried Schwarzkopf, Kürten (DE); Tobias Etscheid, Lindlar (DE)

(73) Assignee: VOSS AUTOMOTIVE GMBH, Wipperfürth (DE)

( * ) Notice: Subject to any disclaimer, the term of this patent is extended or adjusted under 35 U.S.C. 154(b) by 465 days.

(21) Appl. No.: 16/088,331

(22) PCT Filed: Mar. 31, 2017

(86) PCT No.: PCT/EP2017/000395
§ 371 (c)(1),
(2) Date: Sep. 25, 2018

(87) PCT Pub. No.: WO2017/167452
PCT Pub. Date: Oct. 5, 2017

(65) Prior Publication Data
US 2019/0101235 A1    Apr. 4, 2019

(30) Foreign Application Priority Data
Mar. 31, 2016  (DE) .................... 10 2016 003 706.7

(51) Int. Cl.
*F16L 53/38* (2018.01)
*H05B 3/56* (2006.01)

(52) U.S. Cl.
CPC ............... *F16L 53/38* (2018.01); *H05B 3/56* (2013.01); *H05B 2203/005* (2013.01); *H05B 2203/014* (2013.01); *H05B 2203/037* (2013.01)

(58) Field of Classification Search
CPC ..... F16L 53/38; H05B 3/56; H05B 2203/005; H05B 2203/014; H05B 2203/037
See application file for complete search history.

(56) References Cited

U.S. PATENT DOCUMENTS 6,556,780 B2 *   4/2003   Mjelstad ............. F24H 1/105
                                                392/469
2005/0274713 A1   12/2005  Malone et al.
(Continued)

FOREIGN PATENT DOCUMENTS

DE        10137976 A1    11/2002
DE     102010032189 A1    1/2012
(Continued)

*Primary Examiner* — Geoffrey S Evans
(74) *Attorney, Agent, or Firm* — Hudak, Shunk & Farine Co. LPA

(57) ABSTRACT

A pre-fabricated heatable media line having at least one pipe- and/or hose-type media line, at least one line connector located on the end of the line and at least one pre-fabricated heating element, the pre-fabricated heating element including at least two heating element portions connected in at least one circuit and at least one of the heating element portions extends over at least part of the at least one line connector and the at least one pipe- and/or hose-type media line in order to heat the at least one part of the line connector and the at least one pipe- and/or hose-type media line. In the pre-fabricated heatable media line, at least one of the heating element portions is designed as a mixed stranded wire having a number of stranded individual wires consisting of at least two different materials.

14 Claims, 4 Drawing Sheets

(56) References Cited

U.S. PATENT DOCUMENTS

| | | | | |
|---|---|---|---|---|
| 2009/0114422 | A1* | 5/2009 | Longatti | H02G 7/16 174/128.1 |
| 2010/0126986 | A1* | 5/2010 | Gunzing | F16L 11/085 219/643 |
| 2013/0330065 | A1* | 12/2013 | Schwarzkopf | F01N 3/2066 392/468 |
| 2014/0366974 | A1* | 12/2014 | Etscheid | F01N 3/2066 138/33 |
| 2015/0257205 | A1* | 9/2015 | Hase | H05B 3/20 219/539 |
| 2015/0260326 | A1* | 9/2015 | Westmeier | F16L 53/38 138/33 |
| 2018/0080591 | A1* | 3/2018 | Etscheid | H05B 3/56 |
| 2018/0220494 | A1* | 8/2018 | Kim | H01B 13/02 |

FOREIGN PATENT DOCUMENTS

| | | |
|---|---|---|
| DE | 102011120358 A1 | 4/2013 |
| DE | 102014012851 A1 | 3/2016 |
| WO | 2015090662 A1 | 6/2015 |
| WO | 2016096113 A1 | 6/2016 |
| WO | 2016155988 A1 | 10/2016 |

* cited by examiner

PRE-FABRICATED HEATABLE MEDIA LINE AND PRE-FABRICATED HEATING ELEMENT FOR USE IN SAME

FIELD OF THE INVENTION

The invention relates to a pre-fabricated heatable media line with at least one pipe- and/or hose-type media line, at least one line connector arranged at the end of the latter, and with at least one pre-fabricated heating element, wherein the heating element comprises two heating element portions, which are connected in at least one circuit, and at least one of the heating element portions extends over at least part of the at least one line connector, and the at least one pipe- and/or hose-type media line, in order to heat the at least one part of the line connector, and the at least one pipe- and/or hose-type media line, together with a pre-fabricated heating element for use in such a pre-fabricated heatable media line.

BACKGROUND OF THE INVENTION

Pre-fabricated heatable media lines are known in the art, as are pre-fabricated heating elements. Such a pre-fabricated heatable media line comprises at least one media line, which can be in the form of a pipe and/or hose, and at least one-line connector arranged at one end of the latter. The media line usually comprises at least one wall, which externally bounds an inner cavity, or an inner line bore. A medium can flow through the inner bore of the media line. Line connectors serve to connect at least two media lines, or to connect a media line with any unit.

In vehicles, in particular, such pre-fabricated heatable media lines are provided for conducting media that are liquid, at least in an aggregate state. Media are often conducted through the pre-fabricated heatable media line, which by virtue of a relatively high freezing point, tend to freeze even at quite high ambient temperatures, as a result of which the functionality of a vehicle, for example, can be impaired or even significantly disrupted. This is evident, in particular, in the case of water lines for windscreen washer systems, as in the case of pre-fabricated heatable media lines, by means of which an aqueous urea solution is transported as a medium that is used as a $NO_x$ reaction additive for diesel engines with so-called SCR catalysts. In order to prevent freezing of the medium in the pre-fabricated heatable media line at low temperatures, or to thaw out a medium already frozen in the pre-fabricated media line, a heating system is provided. For purposes of heating the media line and/or the at least one line connector, it is of known art to provide a pre-fabricated heating element, which is wound around the outer surface of the media line, and/or the line connector, or is arranged for example in the wall of the media line, so as to enable heating of the medium flowing through the inner bore of the media line and the line connector arranged at least at one end of the latter.

Depending on the arrangement of the respective line connector arranged at one end of the media line and the pre-fabricated heatable media line, diverse temperature conditions prevail, in particular in a vehicle, for example in the vicinity of the vehicle engine or the vehicle tank, and accordingly a differing heat requirement exists, in particular in the vicinity of the line connector of the pre-fabricated heatable media line. A cold end of the pre-fabricated heatable media line is to be found in the vicinity of a vehicle tank, and a hot end in the vicinity of a metering point of an injection device, that is to say, close to the exhaust system, or the engine, so that advantageously a different power input is provided at the two-line connectors of the pre-fabricated heatable media line. In the region that is hot, or warmer than the ambient temperature, in which the pre-fabricated heatable media line is arranged, that is to say, close to the exhaust system or the engine, the heat radiation that is already present there is often sufficient for heating the medium flowing through the pre-fabricated heatable media line, that is to say, is in particular sufficient for thawing out the medium when there are low ambient temperatures external to the vehicle. In order to achieve this, it is known in the art to provide a different number of windings, and/or a different arrangement of the heating elements, on the two-line connectors that are arranged at the ends of the at least one media line. With an equal number of heating elements on the two-line connectors, a power input can be varied, for example, by providing a different pitch for the heating elements, and/or a different arrangement or management of the heating elements on the line connectors. This is known in the art, for example, from DE 10 2011 120 358 A1.

In accordance with this prior art document, on the one hand, different heating elements can be provided on the two-line connectors, and/or the heating elements can have a different resistance in the regions of the two-line connectors. Different heat requirements in the vicinities of the two-line connectors of the pre-fabricated heatable media line can thus be catered for by different power inputs in the vicinities of the two-line connectors. If, for example, a hot zone is present at one line connector, thus at one end of the pre-fabricated heatable media line, for example in the region of a metering point close to the engine or the exhaust system, in accordance with DE 10 2011 120 358 A1 a heating element with a lower resistance is used than at the other line connector, that is to say, at the other end of the pre-fabricated heatable media line, which is located in a cold zone, for example in the vicinity of a vehicle tank. Here the second heating element can thus have a comparatively high resistance. A variation of the heat input is furthermore disclosed, in that on one of the two-line connectors the heating elements extending along the media line are provided for purposes of arrangement on the line connector, and a third heating element is provided for purposes of arrangement on the other line connector, wherein the third heating element is connected to the other two heating elements.

Furthermore, it is disclosed that just one or two heating elements can be arranged at or on only one-line connector in order to heat just the latter.

Thus similar, identical or differing requirements with regard to the heat requirement can prevail at the two-line connectors of the pre-fabricated heatable media line. Also, the line connector itself can be designed in a very different manner with regard to its dimensions and shape, which can be angled or straight. In the interests of cost savings, however, the variance here should be as small as possible. The resistance, that is to say, the specific resistance, of the heating element can therefore be varied independently of the particular design of the line connector, with a predetermined heating element length and cross-sectional area of the heating element, together with a ribbed structure on the outer surface of the line connector, in which the heating element is arranged. To save costs, the smallest possible number of heating elements or heating element portions should be provided; these extend along the media line and the line connector arranged at least at one end of the latter. Also, for purposes of heating the media line itself there are usually requirements to consider, such as the specific resistance of the heating element and its cross-sectional area.

When arranging the heating element or the heating element portions along the media line, their length can be varied as required by varying the pitch, that is to say, the number of turns, on a spiral winding around the media line, as disclosed for example in DE 10 2010 032 189 A1. When varying the pitch it only proves to be problematic that with too large a pitch, bending of the media line can occur, leading to a lifting of the heating element, or heating element portion, from the surface, and with too small a pitch of the winding of the media line with the at least one heating element, or heating element portion, the costs rise sharply, since a much longer heating element length, or heating element portion length, is required than with a smaller pitch of the winding. In the case of two heating element portions, which are arranged along the media line as a result of being wrapped, it is necessary for both to be arranged on the media line with about the same winding pitch, in order to avoid crossover between the heating element portions during the winding process.

For cost reasons, it proves useful to design the cross-sectional area of the heating element, or heating element portion, to be as low as possible, while providing a heating element that can still be manufactured, wherein for production reasons when providing a plurality of heating element portions, an approximately uniform heating element cross-section, that is to say, an approximately uniform cross-sectional area of the heating element portions would be advantageous, so as to enable unproblematic connections of the heating element portions, for example by crimping, shrinking, or winding.

SUMMARY OF THE INVENTION

The object underlying the present invention is therefore the provision of a pre-fabricated heatable media line and a pre-fabricated heating element for use in the latter, in which a minimum possible cross-sectional area of the heating element, or the heating element portions, can be provided, as can similar or equal diameters of the heating element portions to be connected, and at the same time a differing heat requirement along the pre-fabricated heatable media line can be catered for, in particular in the vicinity of the at least one line connector and the media line.

The object is achieved for a pre-fabricated heatable media line with at least one pipe-type and/or hose-type media line, at least one-line connector arranged at an end of the latter, and with at least one pre-fabricated heating element, wherein at least one of the heating element portions is designed as a mixed wire strand, which has a number of twisted individual wires, consisting of at least two different materials. For a pre-fabricated heating element for use in such a pre-fabricated heatable media line, the object is achieved in that the pre-fabricated heating element comprises at least two series-connected heating element portions, wherein at least one of the two heating element portions is designed as a mixed wire strand having a number of twisted individual wires, consisting of at least two different materials. Further developments of the invention are defined in the dependent claims.

By this means, a pre-fabricated heatable media line and a pre-fabricated heating element for use in such a pre-fabricated heatable media line are provided, in which a selective adjustment or selection of the specific resistance of the heating element, or heating element portion, is enabled by the use of a mixed wire strand. By this means, a degree of freedom by way of selective adjustment of the specific resistance is thus possible for a predefinable minimum diameter, or a predefinable minimum cross-sectional area, of a heating element portion. By using at least one heating element portion designed as a mixed wire strand, which thus has a number of twisted individual wires consisting of at least two different materials, the desired specific resistance of the heating element portion can be adjusted by the variance between these individual wires. The specific resistance is material-dependent, so that by selecting different materials for the individual wires of the mixed wire strand, the specific resistance of the latter, that is to say, of the said heating element portion, can be adjusted. Since the resistance R of the heating element portion is a function of the specific resistance $\rho$, the length l of the heating element portion, and its cross-sectional area A, that is to say, $R=(\rho \times l)/A$, a degree of freedom is created by the possibility of varying the specific resistance of the heating element portion if the length of the heating element portion and its cross-sectional area are predetermined, and accordingly held constant for the application in question. A differing heat requirement along the pre-fabricated heatable media line can thus be catered for by varying the particular specific resistance of the heating element portions by means of appropriately different choices of material for its individual wires, and accordingly by differing heat input by way of the heating element portions into the media line and the one or more line connectors of the pre-fabricated heatable media line.

When a heating element of known in the art is provided, which has only one heating wire made of a particular material, or a heating strand with a number of individual wires, all of which consist of the same material, this is not possible, since the said one material has only one particular specific resistance. A variation is possible only by selecting a heating element with a heating wire, or a heating strand with individual wires, made of another substance or material. However, this is possible at high cost by storing a large number of heating elements, or heating element portions, of respectively different materials.

By varying the materials of the individual wires of the heating element portions, their specific resistances can be adjusted. With the provision of a mixed wire strand the design of the specific resistance of the heating element portion on the line connector at the first end of the pre-fabricated heatable media line, and the design of the specific resistance of the heating element portion on the line connector at the second end of the pre-fabricated heatable media line can thus be effected differently, in accordance with the particular requirements of the application, by an appropriately suitable choice of material for the individual wires of the mixed wire strand.

The mixed wire strand advantageously consists of a number of individual wires twisted around a high tensile strength support element or a high tensile strength core, of which at least one individual wire can consist of a copper-nickel alloy, and at least one of the other individual wires can consist of copper, or a nickel-chromium alloy. Furthermore, at least one of the twisted individual wires of the at least one heating element portion can consist of a copper-zinc alloy or a copper-tin alloy. These materials prove to be particularly advantageous with regard to the selective adjustment of the specific resistance of the heating element portion, that is to say, of the mixed wire strand.

For example, one or a plurality of the following materials can be used as materials for at least one of the individual wires of the mixed wire strand, that is to say, of at least one heating element portion: Cu with a specific resistance of 0.0178 $\Omega mm^2/m$, CuNi1 with a specific resistance of 0.025 $\Omega mm^2/m$, CuNi2 with a specific resistance of 0.050 $\Omega mm^2/m$, CuNi6 with a specific resistance of 0.100 $\Omega mm^2/m$, CuNi10 with a specific resistance of 0.150 $\Omega mm^2/m$, CuNi15 with a specific resistance of 0.210 $\Omega mm^2/m$, CuNi23Mn with a specific resistance of 0.300 $\Omega mm^2/m$, CuNi30Mn with a specific resistance of 0.400 $\Omega mm^2/m$, and CuNi44 with a specific resistance of 0.490 $\Omega mm^2/m$, wherein in each case the specific resistances are determined at a temperature of 20° C. Furthermore, NiCr3020 with a specific resistance of $\Omega mm^2/m$ (at 20° C.) can be used as a nickel-chromium alloy. The specific resistances of the individual wires twisted together can differ from one another by 0.008 up to 0.74 $\Omega mm^2/m$ (at 20° C.).

The high tensile strength support element can consist of a plastic material, in particular a plastic profile. Suitable plastic materials are, for example, Kevlar® or Vectran®. In particular, the outer diameter of the high tensile strength support element can correspond to that of one of the (electrical) individual wires of the mixed wire strand, which are twisted around the high tensile strength support element.

However, one of the individual wires can also serve as the high tensile strength support element, so that the material of the high tensile strength support element then corresponds to that of one of the individual wires, in particular a metal or a metal alloy.

Furthermore, by using such a mixed wire strand as a heating element portion, it is possible to use the same heating element portions on the line connector and the media line, which at its end is connected to the line connector, so that any interruption in the transition region between line and line connector can be avoided, and costs for the heating element can be kept as low as possible, which otherwise would increase with the provision of a larger number of heating element portions. Advantageously, therefore, just two or three heating element portions are provided, which are connected in series to form the pre-fabricated heating element.

Further advantageously, the at least one pipe- and/or hose-type media line and the at least one-line connector can be adaptively wrapped around with the at least one heating element. This means that an external winding onto the pipe- and/or hose-type media line and the line connector arranged at least at one end of the latter is provided, wherein the transition region between the media line and line connector is also wound onto without interruption, and one or two heating element portions are arranged in this transition region between media line and line connector without any transition or interruption; thus no crimping point or other kind of connection point is provided between the heating element portions in the transition region between media line and line connector.

Further advantageously, the heating element comprises two or three heating element portions. Advantageously, accordingly, only a few connection points or crimping points are provided along the heating element. The respective ends of the heating element portions can be short-circuited or connected to electrical supply lines so as to be able to connect the heating element, composed of the series-connected heating element portions, to an electrical power source.

Advantageously, two heating element portions connected together have the same or similar outer diameters or cross-sectional areas, in particular wire strand outer diameters with a tolerance of +/−0.05 mm. By using a mixed wire strand it is possible to provide the same, or essentially the same, cross-sectional areas. By this means it is possible to connect two heating element portions together particularly well, in particular by crimping. The individual wires themselves can, for example, have an outer diameter of 0.19 mm when six or seven twisted individual wires are provided, or 0.115 mm when 19 twisted individual wires are provided, or 0.082 mm when 37 individual wires, twisted together, are provided.

Since the at least one heating element portion is inserted into the rib structure on the outer surface of the line connector so as to be able to provide heating of the medium flowing through the latter, the dimensions of the distances between the ribs, or the grooves between the ribs, into which the at least one heating element portion is inserted, already determine the maximum outer diameter of the heating element portion. The design of the optimum outer diameter of the heating element portion is thus determined by a good heat input into the material of the line connector, and a small amount of scatter in the cross-sectional area of the heating element portion. Here better heating is usually possible by using a heating element portion with a smaller outer diameter. For example, therefore, two heating element portions connected together can each have a minimum cross-sectional area of 0.15 $mm^2$, in particular when a wire strand made up of seven individual wires is provided for the heating element portion in question. Here, a low-cost solution with a sufficiently high tensile strength is provided, so as to avoid undesirable damage by e.g. breakage or cracking of the heating element portion, in particular when wrapping it around the media line and the at least one-line connector, which is connected to the latter. Furthermore, with the provision of a cross sectional area of the heating element portion of at least 0.15 $mm^2$, a good crimp quality is also possible. An optimum range for the cross-sectional area of such a heating element portion lies between 0.15 and 0.37 $mm^2$, in particular between 0.17 and 0.23 $mm^2$. Particularly preferably, the cross-sectional area of the heating element portion can be 0.20 $mm^2$, since in this range a particularly high tensile strength and applicability of the heating element portion is provided, as is a good compromise between ease of installation and low material usage. It has been found that heating element portions with a cross-sectional area of more than 0.30 $mm^2$, such as e.g. 0.37 $mm^2$, prove to be no longer as advantageously applicable, due to the increased material costs, and also because of the large dimensions. The cross-sectional area of, in particular, 0.2 $mm^2$, signifies the cross-sectional area of the metallic individual wires, that is to say, excluding their insulation sheathing. An individual wire can, for example, have a cross-sectional area of 0.015 $mm^2$.

The mixed wire strand can be formed, for example, from 6, 7, 19 or 37 individual wires, wherein an embodiment variant with 6 individual wires is, or can be, designed without a high tensile strength support element. The individual wires preferably have the same wire diameter. In principle, however, they can also have different wire diameters, if this proves to be advantageous in specific applications. It proves to be particularly advantageous if the at least one heating element portion, designed as a mixed wire strand, comprises seven twisted individual wires. Here the resulting lay length when twisting the individual wires into the at least one heating element portion is advantageously 6 to 15 mm, in particular 9 mm. Here the lay length has an influence on the resulting resistance, wherein the influence is about 3%. On the outer surface, the at least one heating element portion advantageously has a protective sheath, which in particular consists of a plastic material. This can have a minimum wall thickness of 0.2 mm.

The pipe- and/or hose-type media line and the at least one-line connector can be connected together in a form fit, and/or in a force fit, or can be materially bonded together. On the outer surface, the pre-fabricated heatable media line can be surrounded by at least one insulating protective covering, in particular a cladding tube, such as a corrugated tube, extending around the pipe- and/or hose-type media line, and the one or more line connectors can be surrounded by at least one protective cap. The insulating effect is achieved by the air trapped between the protective covering and the outer surface of the media line, or the at least one-line connector.

A particularly good fixation of the at least one prefabricated heating element on the pipe- and/or hose-type media line to provide particularly good heating of the media line can be effected in that the at least one pipe- and/or hose-type media line is provided with the at least one pre-fabricated heating element, and the at least one pre-fabricated heating element, by means of at least partial wrapping of the media line provided with the latter, is fixed with at least one film element on the latter, and the media line, provided with the at least one pre-fabricated heating element and the at least one film element, is heated for purposes of the better embedding of the pre-fabricated heating element in the film element, and the better placement of the latter on the outer surface of the media line. By the heating of the media line provided with the at least one pre-fabricated heating element and the at least one film element, it is not only possible for the latter to be better shaped for specific applications, in particular curved. As a result of the applied heat, the at least one film element can also be relaxed and shrunk, which results in a better embedding of the at least one heating element in the film element, and a better placement of the latter on the outer surface of the media line, between the turns of the at least one heating element. A film element that shrinks with the application of heat can advantageously be used. This makes it possible to achieve a particularly good fixation of the at least one heating element on the media line, and placement of the heating element on the latter, and thus a very good heat transfer from the heating element to the wall of the media line, and thus a particularly good heating of the medium flowing through the media line. An application of the at least one film element can also be affected only partially. Even with such a partial application of the film element on the pipe- and/or hose-type media line, in particular by partial wrapping of the latter, the at least one heating element can also be well fixed on the latter, so that a very good heat input into the wall of the media line can be achieved.

By combining the provision of a mixed wire strand and an at least partial winding of the media line, provided with the at least one heating element, with at least one film element, such as a PET film element, that is to say, a film element made of polyethylene, synergistic effects are possible. When using a transparent film material for the at least one film element, it is possible, with different colouring of the heating elements, to detect the latter through the film element, so that optical detection from the outside through the film element of different resistances of the heating elements is possible.

Mixed wire strands allow material savings by virtue of a comparatively particularly small cross-section, that is to say, by virtue of a particularly small cross-sectional area comparatively. At the same time this also improves the contact of the film element on the at least one heating element and the pipe- and/or hose-type media line, that is to say, the attachment of the film element onto heating element and media line. The contact can be further improved by stretchability, and the overstretching, or plastic deformation, of the film element. The at least one film element is thus advantageously stretched, and/or overextended, and/or plastically deformed, as it is wound onto the media line with the at least one heating element arranged on the latter.

The winding of a pipe- and/or hose-type media line with mixed wire strands and with at least one film element generally speaking provides for a comparatively small diameter of the wound media line. A sheathing by a protective covering, such as a corrugated tube, with an air gap between the corrugated tube and the media line, or an insulation foam, such as Santoprene®, for example, can be affected with correspondingly low material usage, that is to say, a small inner diameter of the protective covering can be provided, for example. This leads to a cost-effective solution and at the same time to versatile applicability, since the space requirement of the accordingly formed pre-fabricated media line is comparatively low.

The pre-fabrication of a media line is thus affected, in that initially the pipe- and/or hose-type media line is in particular continuously wound onto with at least one heating element, and is subsequently wound onto with at least one adhesive tape, fabric adhesive tape, or fabric tape, and/or at least one film element. In order to be able to provide the correspondingly pre-fabricated media line at the end with at least one-line connector, the tape and/or film element and heating element(s) are wound back at the end or ends. A pre-fabrication can then be affected with the at least one line connector, wherein the at least one line connector is connected to the end to the media line, e.g. by laser welding. If, instead of a film element, a conventional adhesive tape, fabric tape, fabric adhesive tape or the like is used with a tape material provided with an adhesive for purposes of winding onto the media line provided with the at least one heating element, wherein the adhesive for adhering the adhesive tape, fabric tape, or fabric adhesive tape onto the media line and with overlapping winding onto the tape itself leads to adhesive residues remaining on the media line after the tape has been wound back. The residues must be removed in a time-consuming manner before the ends of the media line can be connected, in particular welded, to the line connectors. The above described use of the at least one film element for fixing the at least one heating element on the media line therefore proves to be particularly advantageous since the said disadvantage of adhesive residues no longer occurs.

BRIEF DESCRIPTION OF THE DRAWINGS

For further explanation of the invention embodiments of the latter will be described in more detail below with reference to the figures. Here.

DETAILED DESCRIPTION OF THE INVENTION

Figure 1:
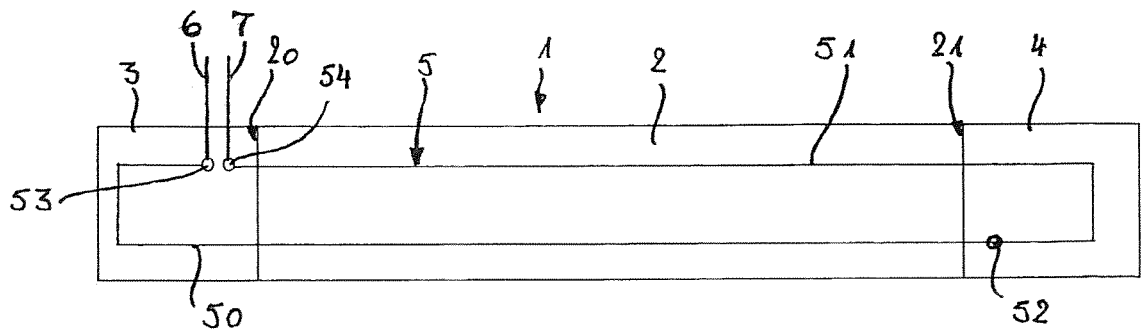
FIG. 1 shows a schematic diagram of a first embodiment of an inventive pre-fabricated heatable media line with two end connectors attached to a pipe-type media line, and two series-connected heating element portions to form a pre-fabricated heating element.

FIG. 1 shows a pre-fabricated heatable media line 1 with a pipe-type media line 2 and two line connectors 3, 4 attached to the ends of the latter. The connection of the pipe-type media line 2 and the two-line connectors 3, 4 can be affected as a form fit, and/or a force fit, or also as a material bond. Instead of a pipe-type media line 2, a hose-type media line can also be provided. It is also possible for the media line to be pipe-type and/or hose-type, with at least one pipe-type section and at least one hose-type section.

Along the media line 1 extends a pre-fabricated heating element 5, which in accordance with FIG. 1 is formed from two series-connected heating element portions 50, 51, connected together at a connection point 52, in particular a crimping point. The heating element portion 50 extends along the pipe-type media line 2, onto the first line connector 3 and into the transition region 21 from the pipe-type media line 2 to the second line connector 4. The second heating element portion 51 also extends along the pipe-type media line 2, furthermore onto the second line connector 4 and into the transition region 20 between the pipe-type media line 2 and the first line connector 3. The connection point 52 is arranged on the second line connector 4, such that the heating element portion 50 extends as far as the latter. On the first line connector 3 the two ends 53, 54 of the two heating element portions 50, 51 are connected to electrical supply lines 6, 7, in particular by means of crimping, via which a connection to an electrical power supply can be affected, so as to enable heating. Thus, no connection point is provided in the two transition regions 20, 21 between the pipe-type media line 2 and the two-line connectors 3, 4, so that as few heating element portions as possible can be provided, which lowers the cost of the pre-fabricated heatable media line compared with the solutions of the prior art.

Figure 13:
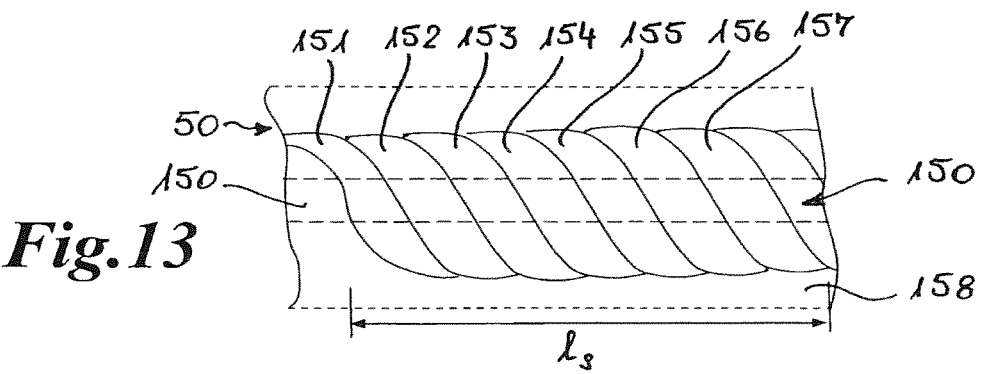
FIG. 13 shows a side detail view of seven twisted individual wires of an inventive heating element portion designed as a mixed stranded wire.
Figure 14:
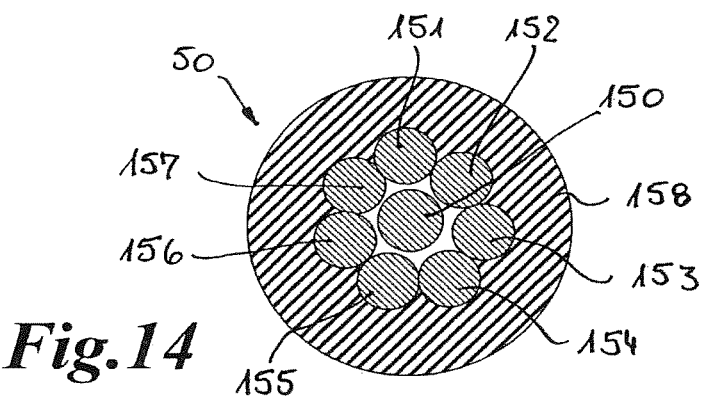
FIG. 14 shows a cross-sectional view through the inventive heating element portion designed as a mixed wire strand, as in FIG. 13, comprising seven individual wires twisted together around a high tensile strength support element.

The two heating element portions 50, 51 are each formed as a mixed stranded wire. This means that they are formed from a number of twisted individual wires, which consist of at least two different materials with different specific resistances. An example of such a mixed wire strand in the form of the heating element portion 50 is shown in cross-section in FIG. 14 and in a detail in FIG. 13. In this example, seven individual wires 151, 152, 153, 154, 155, 156 and 157 are twisted around a high tensile strength support element, or a high tensile strength core 150. The lay length ls of the twisted individual wires can be, for example, 6 to 15 mm, in particular 9 mm (see FIG. 13). The twisted composite of the individual wires is usually surrounded on its outer surface by a protective sheath 158, as indicated in FIGS. 13 and 14.

This consists in particular of a plastic material. By providing such a mixed wire strand for the heating element portions 50, 51 these can be optimally adapted to the particular ambient temperature conditions. If, for example, the region of the pre-fabricated heatable media line 1, on which the first line connector 3 is arranged, is arranged in a hot zone in a vehicle, that is to say, close to the exhaust system or the engine, just a low heat output is required. If, on the other hand, the opposite region of the pre-fabricated heatable media line 1 comprising the second line connector 4 is arranged in a cold zone of a vehicle, such as in the vicinity of a vehicle tank, a higher heat output is required here. This can be adjusted by an appropriate selection of the materials of the individual wires 151 to 157 of the heating element portions 50, 51 in terms of their specific total resistance, since $R=(\rho*l)/A$, wherein R is the resistance, $\rho$ is the specific resistance, l is the length of the heating element portion, and A is its cross-sectional area. Accordingly, overheating in the hot zone, and insufficient thawing out, or no thawing out, in the cold zone, can be avoided.

Figure 2:
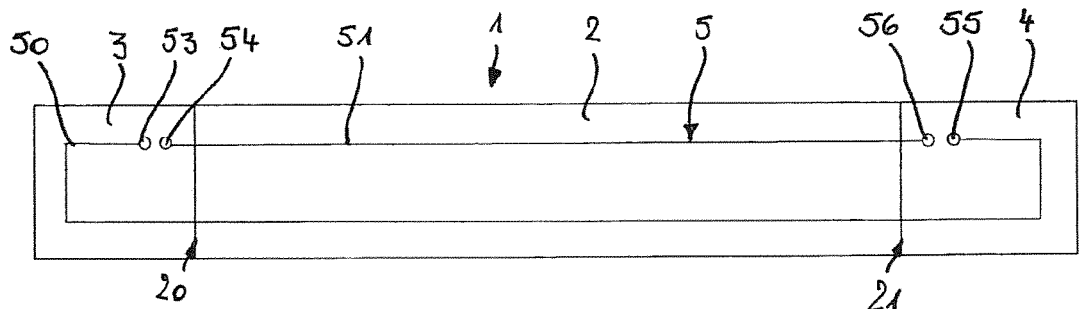
FIG. 2 shows a schematic diagram of a second embodiment of an inventive pre-fabricated heatable media line, with two-line connectors attached to the ends of a pipe-type media line, and two heating element portions.

FIG. 2 shows another arrangement of the two heating element portions 50, 51 along the pipe-type media line 2 and on the two-line connectors 3, 4. There the heating element portion 50 extends along the pipe-type media line 2 and onto the first line connector 3 and the second line connector 4. The heating element portion 51 extends only along the pipe-type media line 2 and over the transition regions 20, 21 onto the first line connector 3 and the second line connector 4. The ends 53, 54 and 55, 56 of the two heating element portions 50, 51 are arranged on the two-line connectors 3, 4. Accordingly, electrical supply lines 6, 7 can be connected to the ends 53, 54 and 55, 56, respectively, or the ends 53, 54 and 55, 56 respectively can be short-circuited. A suitable selection can be made depending on the particular application.

Figure 3:
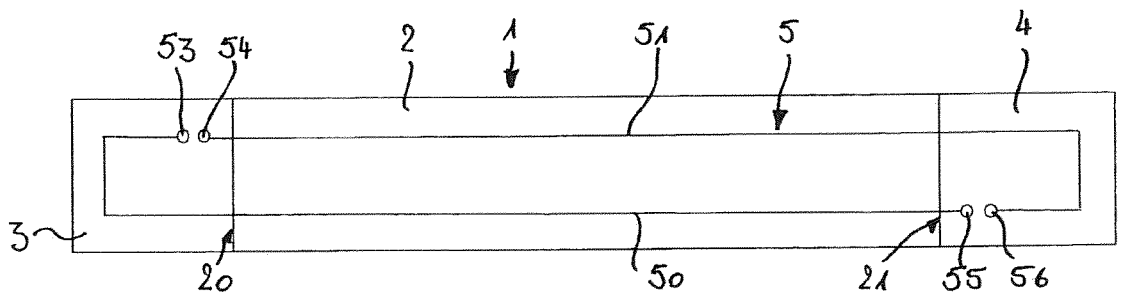
FIG. 3 shows a schematic diagram of a third embodiment of an inventive pre-fabricated heatable media line, with two-line connectors attached to the ends of a pipe-type media line, and two heating element portions, as a modification to the embodiment in FIG. 1.

The embodiment of the pre-fabricated heatable media line 1 in FIG. 3 differs from that in FIG. 1 in that the ends 55, 56 of the two heating element portions 50, 51 are not crimped together at the connection point 52, but are free, so that these can be connected together and thereby short-circuited, or can be connected to the said electrical supply lines 6, 7.

Figure 4:
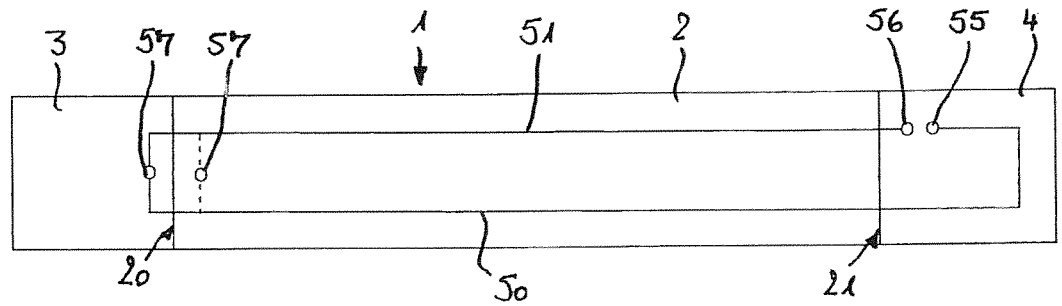
FIG. 4 shows a schematic diagram of a fourth embodiment of an inventive pre-fabricated heatable media line, with two-line connectors attached to the ends of a pipe-type media line, and two series-connected heating element portions to form a pre-fabricated heating element.

In the embodiment variant of FIG. 4, in contrast to the embodiment of the pre-fabricated heatable media line 1 in FIG. 2, the two ends 53, 54 of the two heating element portions 50, 51 are fixedly connected together at a connection point 57, such as a crimping point. The latter is arranged on the first line connector 3, or can be arranged on the pipe-type media line 2, as indicated by the dashed line.

Accordingly, the heating element portion 50 does not extend (dashed line) or just over the transition region 20 and in a very short section onto the first line connector 3, so that the first line connector 3 is hardly heated at all, and thus is arranged in a hot zone of a vehicle, that is to say, in a zone in which a high ambient temperature is anticipated.

Figure 5:
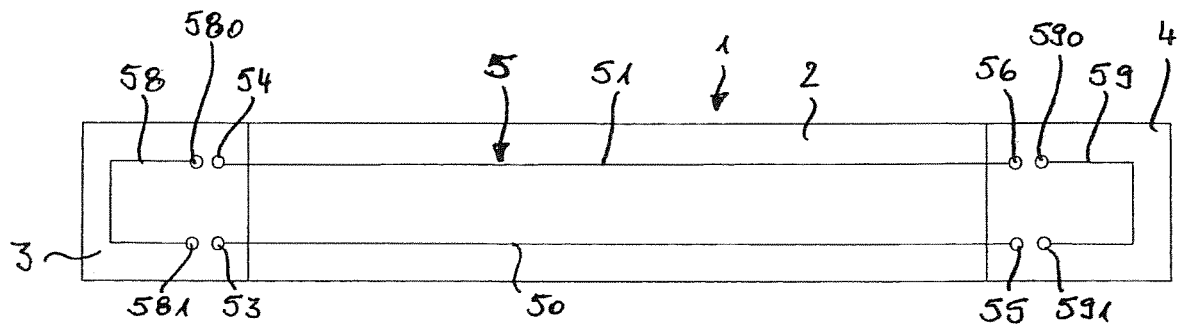
FIG. 5 shows a schematic diagram of a fifth embodiment of an inventive pre-fabricated heatable media line, with two-line connectors attached to the ends of a pipe-type media line, and four heating element portions, wherein two of the heating element portions extend along the pipe-type media line, and in each case a heating element portion extends onto each of the line connectors.

In the embodiment variant of the pre-fabricated heatable media line 1 in accordance with FIG. 5, four heating element portions 50, 51, 58, 59 are provided, wherein the two heating element portions 50, 51 are arranged along the pipe-type media line 2 and in the two transitional regions 20, 21; the heating element portion 58 is arranged on the first line connector 3, and the heating element portion 59 is arranged on the second line connector 4. The ends 53, 54, 55, 56 of the heating element portions 50, 51 can be short-circuited, that is to say, connected to the ends 580, 581, 590, 591 of the heating element portions 58, 59, or can be connected to the electrical supply lines 6, 7 for connection to an electrical power supply (not shown).

Figure 6:
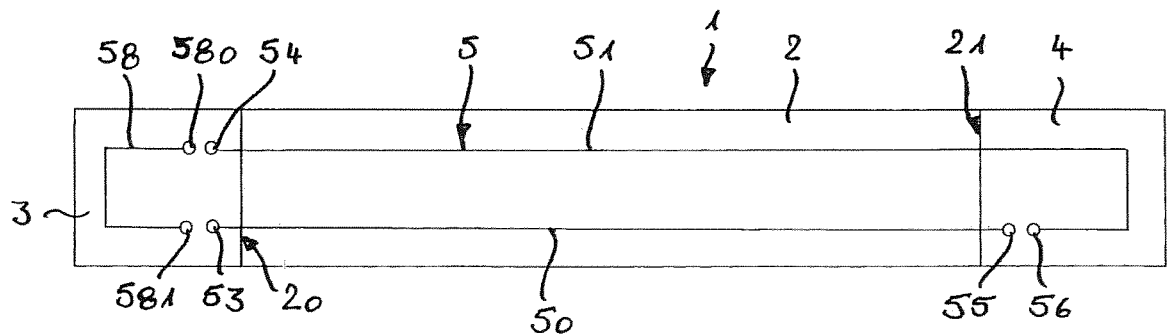
FIG. 6 shows a schematic diagram of a sixth embodiment of an inventive pre-fabricated heatable media line, with two line connectors attached to the ends of a pipe-type media line, and three heating element portions, of which one just extends onto the one line connector, one extends essentially along the pipe-type media line, and the third extends along the pipe-type media line and along the second line connector.

FIG. 6 shows a further embodiment variant of the pre-fabricated heatable media line 1, in which three heating element portions 50, 51, 58 are provided. The heating element portion 51 extends, as in FIG. 3, along the pipe-type media line 2, over the transition region 20, onto the first line connector 3 and at its other end over the second line connector 4. On the latter it can be connected to the heating element portion 50, or to electrical supply lines 6, 7, as shown in FIG. 3 above. The heating element portion 50 extends along the pipe-type media line 2 and over the two transition regions 20, 21. The third heating element portion 58 is arranged on the first line connector 3. At its ends 580, 581 it can be short-circuited to the other two heating element portions 50, 51 at their ends 53, 54, or the ends 580, 581, 53, 54 can be connected to electrical supply lines 6, 7.

Figure 10:
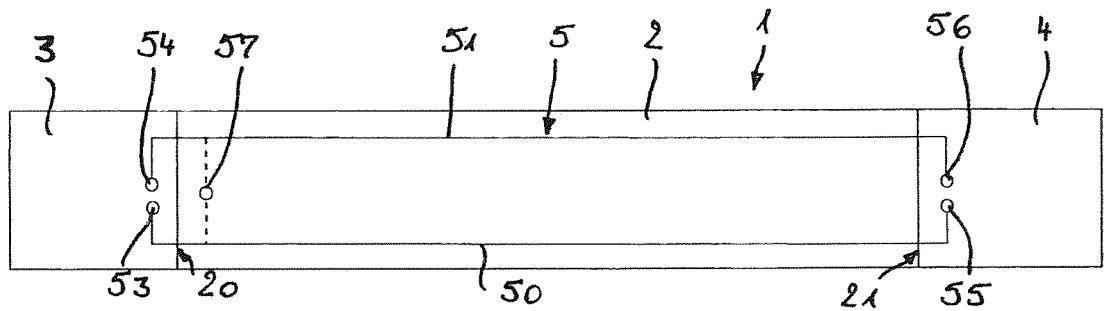
FIG. 10 shows a schematic diagram of a seventh embodiment of an inventive pre-fabricated heatable media line, with two-line connectors attached to the ends of a pipe-type media line, and two heating element portions, as a modification to the embodiment in FIG. 4.

The embodiment variant of the pre-fabricated heatable media line 1 shown in FIG. 10 is a variant of the embodiment shown in FIG. 4. In contrast to the latter, however, the heating element portion 50 does not extend onto the second line connector 4. Rather, the two line connectors 3, 4 are essentially unheated, since the two heating element portions 50, 51, although they extend over the transition regions 20, 21, only extend in a short section onto the two line connectors 3, 4. Their ends 53, 54 and 55, 56 can once again be short-circuited or connected to electrical supply lines 6, 7, to enable connection to an electrical power supply (not shown). Shown with dashed lines in FIG. 10 is the variant also shown in FIG. 4, in which the two heating element portions 50, 51 are fixedly connected together at the connection point 57 located on the pipe-type media line 2; thus, the first line connector 3 is unheated. The variants shown in FIG. 10 can be provided, in particular, when the entire pre-fabricated heatable media line 1 is arranged in a hot zone, in which no heating of the line connectors 3, 4 is required.

Figure 11:
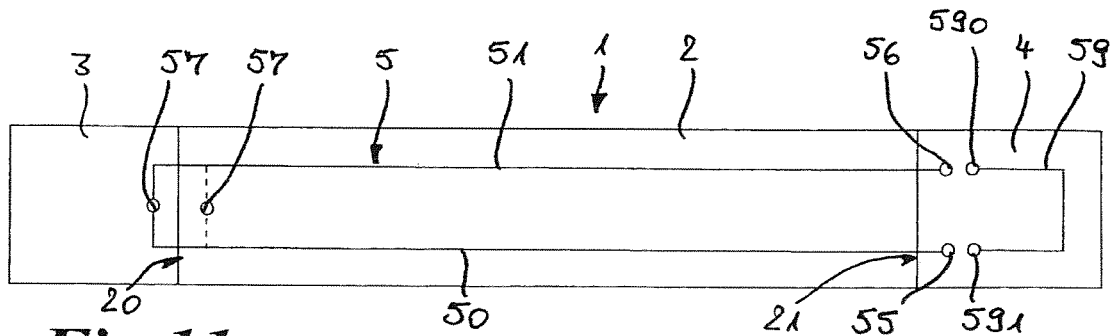
FIG. 11 shows a schematic diagram of an eighth embodiment of an inventive pre-fabricated heatable media line, with two-line connectors attached to the ends of a pipe-type media line, and four heating element portions, wherein two of the heating element portions extend along the pipe-type media line and are connected to one another, and one heating element portion extends onto each of the line connectors.

The embodiment variant of the pre-fabricated heatable media line 1 shown in FIG. 11 comprises three heating element portions 50, 51, 59, wherein the heating element portion 59 is arranged on the second line connector 4, while the two heating element portions 50, 51 extend along the pipe-type media line 2 and over the two transition regions 20, 21. As in the case of the embodiment in FIG. 4, the two heating element portions 50, 51 are fixedly connected together at the connection or crimping point 57 on the first line connector 3, or on the pipe-type media line 2. The ends 56 and 590, or 55 and 591, of the respective heating element portions 51, 59 and 50, 59 can once again be short-circuited or connected to electrical supply lines 6, 7 for purposes of connection to an electrical power supply (not shown).

Figure 12:
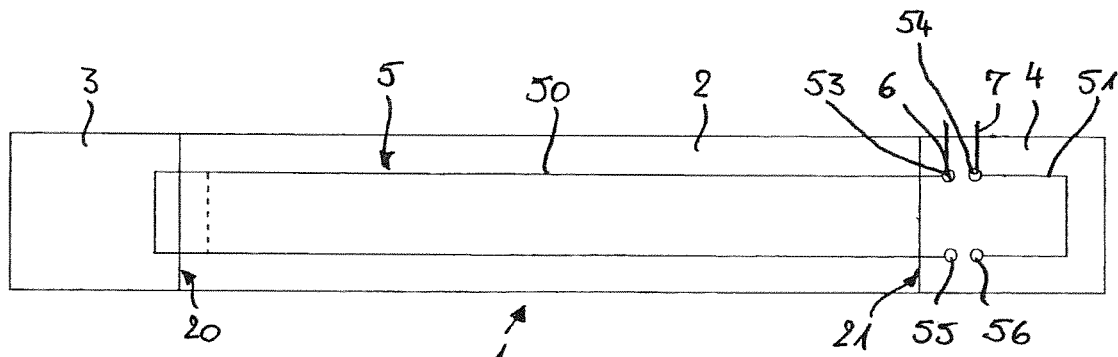
FIG. 12 shows a schematic diagram of a ninth embodiment of an inventive pre-fabricated heatable media line, with two-line connectors attached to the ends of a pipe-type media line, and two heating element portions, wherein the one heating element portion extends along the pipe-type media line and a portion of the one-line connector and the other heating element portion extends onto the other line connector.

In the embodiment variant of the pre-fabricated heatable media line 1 shown in FIG. 12, just two heating element portions 50, 51 are provided, wherein the heating element portion 50 is double-laid, and extends from the second line connector 4, over the transition region 21, the pipe-type media line 2 and the transition region 20 onto a short section of the first line connector 3, and from there extends back across the transition region 20, the pipe-type media line 2 and the transition region 21 onto the second line connector 4. The heating element portion 51 is arranged only on the second line connector 4. At the ends 53, 54 and 55, 56 arranged on the second line connector 4, the heating element portions 50, 51 can be connected together, that is to say, short-circuited, or once again can be connected to electrical supply lines 6, 7, in order to enable a connection to an electrical power supply (not shown). Dashed lines in FIG. 12 show a variant in which the heating element portion 50 does not extend into the transition region 20, or onto the first line connector 3. Here the first line connector 3 and the transition region 20 to the latter remain unheated. In both variants, the first line connector 3 can once again be arranged in a hot zone of a vehicle, while the second line connector 4 is heated and can therefore be arranged in a cold zone.

Figure 7:
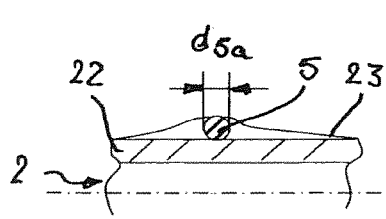
FIG. 7 shows a cross-sectional view through an inventive media line with a pre-fabricated heating element with a comparatively small outer diameter arranged on the latter.
Figure 8:
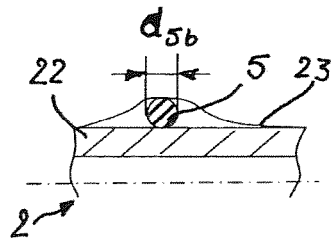
FIG. 8 shows a cross-sectional view through an inventive media line with a pre-fabricated heating element with a comparatively larger outer diameter arranged on the latter.
Figure 9:
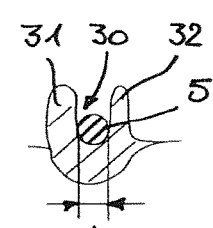
FIG. 9 shows a cross-sectional view through an inventive line connector with a pre-fabricated heating element arranged between its outer surface ribs.

FIGS. 7 and 8 show longitudinal cross-sectional views in the region of a line wall 22 of the pipe-type media line 2, wherein on the outer surface of the line wall 22 in each case one turn of the pre-fabricated heating element 5, or a heating element portion of the latter, is arranged, and is attached by a fixing tape 23, such as a fabric-, adhesive- or fabric adhesive tape, or film element. The difference between FIGS. 7 and 8 is simply that the two pre-fabricated heating elements 5 shown in these figures have a different outer diameter $d_5$. The pre-fabricated heating element 5 or heating element portion shown in FIG. 7 has a smaller outer diameter $d_{5a}$ than the pre-fabricated heating element 5 or heating element portion with an outer diameter $d_{5b}$ shown in FIG. 8. A better heat input is provided with the pre-fabricated heating element 5 shown in FIG. 7 with a smaller outer diameter $d_{5a}$ and a small amount of scatter in the cross-sectional area of the pre-fabricated heating element 5, or of its heating element portions, is possible. This can also be found from the cross-sectional view through an external rib structure, e.g. of the first or second line connector 3, 4, which is shown in FIG. 9. The pre-fabricated heating element 5 or its heating element portion is located in a groove 30 between two ribs 31, 32 of the first line connector 3. An optimal outer diameter $d_5$ of the pre-fabricated heating element 5, or a heating element portion of the latter, leads to an optimal placement in the groove 30 and thus to particularly good heat transfer.

Figure 15:
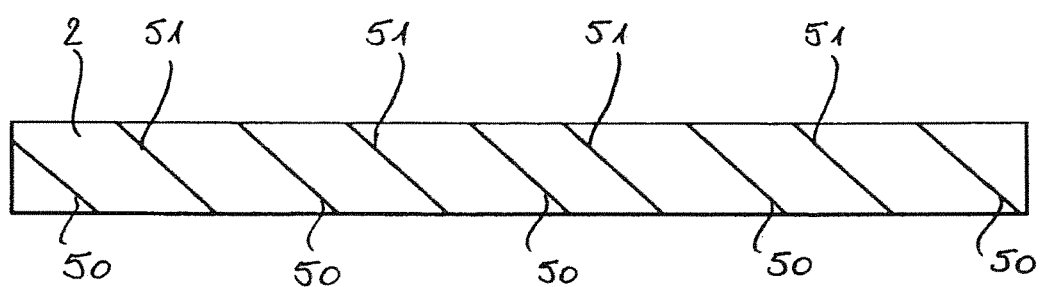
FIG. 15 shows a schematic diagram of a pipe- or hose-type media line with two heating elements arranged wound around the latter.
Figure 16:
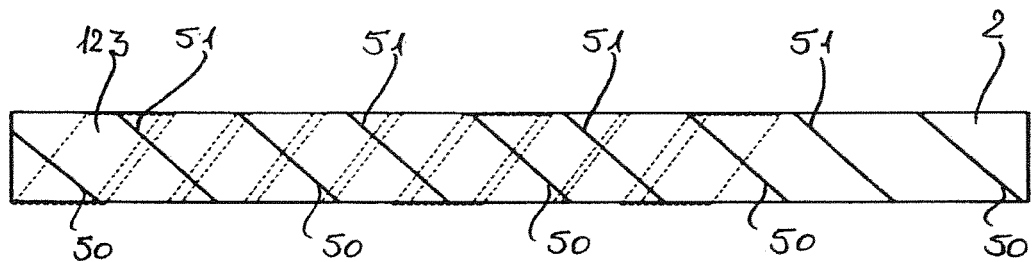
FIG. 16 shows a schematic diagram of the media line provided with the two heating elements as in FIG. 15, wherein for purposes of a fixation of the heating elements on the media line the latter is partially wrapped around with a film element.

FIG. 15 shows the pipe-type media line 2, with two heating element portions 50, 51 wound around the latter. The two heating element portions 50, 51 alternate with each other, as can be seen in the side view of the media line 2 in FIG. 15. As can be seen in FIG. 16, the fixing tape can be designed as at least one film element 123 for purposes of a fixation of the two heating element portions 50, 51 onto the outer surface of the media line 2. This is shown dashed with overlapping turns in FIG. 16. In the embodiment variant shown in FIG. 16, it is wound around the two heating element portions 50, 51, in the opposite direction to the latter, and is also wound around the media line 2. For purposes of fixation, it is sufficient to provide just a section-by-section winding with the at least one film element 123. The latter can also be oriented with the same direction of winding as the heating element portions 50, 51. By heating the media line with the heating element portions 50, 51 arranged on the latter, and the at least one film element 123, the latter relaxes and shrinks, so that it is applied particularly tightly onto the two heating element portions 50, 51 and the outer surface of the media line 2. By this means, a particularly good fixation and tight placement of the heating element portions on the media line is possible, so that a particularly good heating of the media line 2 by the two heating element portions 50, 51 is enabled. When winding onto the media line 2 with the heating element portions 50, 51 or the at least one heating element 5, the at least one film element 123 is advantageously stretched, and/or overextended, and/or plastically deformed, in order to achieve a particularly good placement on the media line and the heating element portions or the heating elements.

The following tables show possible materials for the twisted individual wires of the heating element portions 50, 51 of the pre-fabricated heating elements 5, which are shown in the embodiment variants shown in FIGS. 1 to 6, and 10 to 12, 15, 16. When twisting seven individual wires around a high tensile strength support element 150, as indicated in FIGS. 13 and 14, the following materials listed in Table 1 can be used, for example, for the individual wires. In Table 1 five different examples 1 to 5 are reproduced in rows for different resistances per unit length R that can be achieved with the combinations of individual wires made from the respectively cited materials. Here one of the individual wires can be the high tensile strength support element, for example wire 7=high tensile strength support element 150.

TABLE 1

| | R [Ω/m] | Wire 1 Material | Wire 2 Material | Wire 3 Material | Wire 4 Material | Wire 5 Material | Wire 6 Material | Wire 7 Material |
|---|---|---|---|---|---|---|---|---|
| 1 | 0.097 | Cu | Cu | Cu | Cu | Cu | CuNi1 | CuNi1 |
| 2 | 0.119 | Cu | Cu | Cu | CuNi1 | CuNi1 | CuNi1 | CuNi6 |
| 3 | 0.436 | CuNi2 | CuNi2 | CuNi6 | CuNi6 | CuNi6 | CuNi10 | CuNi10 |
| 4 | 2.658 | CuNi30Mn | CuNi44 | CuNi44 | CuNi44 | CuNi44 | CuNi44 | NiCr3020 |
| 5 | 4.651 | CuNi44 | NiCr3020 | NiCr3020 | NiCr3020 | NiCr3020 | NiCr3020 | NiCr3020 |

Table 2 below lists examples of materials of the individual wires of a heating element portion, once again with seven twisted individual wires for eight examples 1 to 8 of different resistances per unit length R that can be achieved with the combinations of individual wires made from the respectively cited materials.

TABLE 2

| | R [Ω/m] | Wire 1 Material | Wire 2 Material | Wire 3 Material | Wire 4 Material | Wire 5 Material | Wire 6 Material | Wire 7 Material |
|---|---|---|---|---|---|---|---|---|
| 1 | 0.131 | Cu | Cu | Cu | CuNi1 | CuNi2 | CuNi2 | CuNi2 |
| 2 | 0.145 | CuNi1 | CuNi1 | CuNi1 | CuNi1 | CuNi1 | CuNi1 | CuNi6 |
| 3 | 0.177 | CuNi1 | CuNi1 | CuNit | CuNi1 | CuNi2 | CuNi2 | CuNi15 |
| 4 | 0.198 | CuNi1 | CuNi1 | CuNi1 | CuNi1 | CuNi6 | CuNi10 | CuNi10 |
| 5 | 0.218 | CuNi1 | CuNi1 | CuNi2 | CuNi2 | CuNi2 | CuNi2 | CuNi10 |
| 6 | 0.242 | CuNi1 | CuNi2 | CuNi2 | CuNi2 | CuNi2 | CuNi2 | CuNi6 |
| 7 | 0.326 | CuNi2 | CuNi2 | CuNi2 | CuNi2 | CuNi2 | CuNi10 | CuNi15 |
| 8 | 0.397 | CuNi2 | CuNi2 | CuNi2 | CuNi6 | CuNi6 | CuNi10 | CuNi15 |

Table 3 below shows possible materials for the individual wires of a heating element portion with nineteen twisted individual wires for five examples 1 to 5 of different resistances per unit length R that can be achieved with the combinations of individual wires made from the respectively cited materials.

TABLE 3

|  |  | Example 1 | Example 2 | Example 3 | Example 4 | Example 5 |
|---|---|---|---|---|---|---|
|  |  |  |  | R [Ω/m] |  |  |
|  |  | 0.131 | 0.145 | 0.162 | 0.177 | 0.198 |
| Wire 1 | Material | Cu | CuNi1 | Cu | CuNi1 | CuNi1 |
| Wire 2 | Material | Cu | CuNi1 | CuNi1 | CuNi1 | CuNi1 |
| Wire 3 | Material | Cu | CuNi1 | CuNi1 | CuNi1 | CuNi1 |
| Wire 4 | Material | Cu | CuNi1 | CuNi1 | CuNi1 | CuNi1 |
| Wire 5 | Material | Cu | CuNi1 | CuNi1 | CuNi1 | CuNi1 |
| Wire 6 | Material | Cu | CuNi1 | CuNi1 | CuNi1 | CuNi1 |
| Wire 7 | Material | Cu | CuNi1 | CuNi1 | CuNi1 | CuNi1 |
| Wire 8 | Material | CuNi1 | CuNi1 | CuNi1 | CuNi1 | CuNi1 |
| Wire 9 | Material | CuNi1 | CuNi1 | CuNi1 | CuNi1 | CuNi1 |
| Wire 10 | Material | CuNi1 | CuNi1 | CuNi1 | CuNi1 | CuNi1 |
| Wire 11 | Material | CuNi1 | CuNi1 | CuNi1 | CuNi2 | CuNi1 |
| Wire 12 | Material | CuNi1 | CuNi1 | CuNi1 | CuNi2 | CuNi2 |
| Wire 13 | Material | CuNi1 | CuNi1 | CuNi2 | CuNi2 | CuNi10 |
| Wire 14 | Material | CuNi22 | CuNi1 | CuNi2 | CuNi2 | CuNi10 |
| Wire 15 | Material | CuNi2 | CuNi1 | CuNi2 | CuNi2 | CuNi10 |
| Wire 16 | Material | CuNi2 | CuNi1 | CuNi2 | CuNi2 | CuNi10 |
| Wire 17 | Material | CuNi2 | CuNi2 | CuNi2 | CuNi2 | CuNi10 |
| Wire 18 | Material | CuNi2 | CuNi2 | CuNi6 | CuNi2 | CuNi10 |
| Wire 19 | Material | CuNi6 | CuNi6 | CuNi6 | CuNi10 | CuNi15 |

Table 4 below shows possible materials for the individual wires of a heating element portion with thirty-seven twisted individual wires for five examples 1 to 5 of different resistances per unit length R that can be achieved with the combinations of individual wires made from the respectively cited materials.

TABLE 4

|  |  | Example 1 | Example 2 | Example 3 | Example 4 | Example 5 |
|---|---|---|---|---|---|---|
|  |  |  |  | R [Ω/m] |  |  |
|  |  | 0.131 | 0.145 | 0.162 | 0.177 | 0.198 |
| Wire 1 | Material | Cu | Cu | Cu | CuNi1 | CuNi1 |
| Wire 2 | Material | Cu | CuNi1 | Cu | CuNi1 | CuNi1 |
| Wire 3 | Material | Cu | CuNi1 | CuNi1 | CuNi1 | CuNi1 |
| Wire 4 | Material | Cu | CuNi1 | CuNi1 | CuNi1 | CuNi1 |
| Wire 5 | Material | Cu | CuNi1 | CuNi1 | CuNi1 | CuNi1 |
| Wire 6 | Material | Cu | CuNi1 | CuNi1 | CuNi1 | CuNi1 |
| Wire 7 | Material | Cu | CuNi1 | CuNi1 | CuNi1 | CuNi1 |
| Wire 8 | Material | Cu | CuNi1 | CuNi1 | CuNi1 | CuNi1 |
| Wire 9 | Material | Cu | CuNi1 | CuNi1 | CuNi1 | CuNi1 |
| Wire 10 | Material | Cu | CuNi1 | CuNi1 | CuNi1 | CuNi1 |
| Wire 11 | Material | Cu | CuNi1 | CuNi1 | CuNi1 | CuNi1 |
| Wire 12 | Material | Cu | CuNi1 | CuNi1 | CuNi1 | CuNi1 |
| Wire 13 | Material | Cu | CuNi1 | CuNi1 | CuNi1 | CuNi1 |
| Wire 14 | Material | Cu | CuNi1 | CuNi1 | CuNI1 | CuNi1 |
| Wire 15 | Material | CuNi1 | CuNi1 | CuNi1 | CuNi1 | CuNi2 |
| Wire 16 | Material | CuNi1 | CuNi1 | CuNi1 | CuNi1 | CuNi2 |
| Wire 17 | Material | CuNi1 | CuNi1 | CuNi1 | CuNi1 | CuNi2 |
| Wire 18 | Material | CuNi1 | CuNI1 | CuNi1 | CuNi1 | CuNi2 |
| Wire 19 | Material | CuNi1 | CuNi1 | CuNi1 | CuNi2 | CuNi2 |
| Wire 20 | Material | CuNi1 | CuNi1 | CuNi1 | CuNi2 | CuNi2 |
| Wire 21 | Material | CuNi1 | CuNi1 | CuNi1 | CuNi2 | CuNi2 |
| Wire 22 | Material | CuNi1 | CuNi1 | CuNi1 | CuNi2 | CuNi2 |
| Wire 23 | Material | CuNi1 | CuNi1 | CuNi1 | CuNi2 | CuNi2 |
| Wire 24 | Material | CuNi1 | CuNi1 | CuNi1 | CuNi2 | CuNi2 |
| Wire 25 | Material | CuNi1 | CuNi1 | CuNi1 | CuNi2 | CuNi2 |
| Wire 26 | Material | CuNi1 | CuNi1 | CuNi2 | CuNi2 | CuNi2 |
| Wire 27 | Material | CuNi2 | CuNi1 | CuNi2 | CuNi2 | CuNi2 |
| Wire 28 | Material | CuNi2 | CuNi1 | CuNi2 | CuNi2 | CuNi2 |
| Wire 29 | Material | CuNi2 | CuNi1 | CuNi2 | CuNi2 | CuNi2 |
| Wire 30 | Material | CuNi2 | CuNi1 | CuNi2 | CuNi2 | CuNi2 |
| Wire 31 | Material | CuNi2 | CuNi2 | CuNi2 | CuNi2 | CuNi2 |
| Wire 32 | Material | CuNi2 | CuNi2 | CuNi6 | CuNi2 | CuNi2 |
| Wire 33 | Material | CuNi2 | CuNi2 | CuNi6 | CuNi2 | CuNi2 |
| Wire 34 | Material | CuNi6 | CuNi2 | CuNi6 | CuNi2 | CuNi2 |
| Wire 35 | Material | CuNi6 | CuNi2 | CuNi10 | CuNi2 | CuNi6 |
| Wire 36 | Material | CuNi6 | CuNi2 | CuNi10 | CuNi2 | CuNi6 |
| Wire 37 | Material | CuNi6 | CuNi6 | CuNi10 | CuNi2 | CuNi10 |

A plastic profile or, for example, an individual wire can be used as a high tensile strength member 150, or a high tensile strength core, of the respective heating element portion, so that in the latter case the material of the high tensile strength support element corresponds to one of the materials from the above Tables 1 to 4. In the latter case, the cross-section through the heating element portion would differ from that shown in FIG. 14, in that one of the individual wires is arranged in the interior as a high tensile strength support element, and the other six individual wires are twisted around the latter. The individual wires can all have the same outer diameter.

In the following, a design example for a pre-fabricated heatable media line with two line connectors 3, 4 is described, wherein the structure is a so-called "two-wire strand" design (as can be seen in FIGS. 1 to 4, 10 and 12), that is to say, in which two heating element portions 50, 51 are provided, wherein in each case a heating element portion 50, 51, which extends along the pipe-type media line 2, is also used for one of the two line connectors 3, 4, as shown in FIGS. 1 and 3. Table 5 below contains specifications of the pre-fabricated media line, wherein the specifications of two different variants I and II are compared with each other.

TABLE 5

Media line with two line connectors,
Two-wire strand design

|  | I |  | II |  |
|---|---|---|---|---|
| Required power output line connector 3 | 1.2 | W | 1.2 | W |
| Exemplary fixed heating element length, line connector 3, defined by the tracking on the latter | 400.0 | mm | 400 | mm |

TABLE 5-continued

Media line with two line connectors,
Two-wire strand design

|  | I |  | II |  |
|---|---|---|---|---|
| Required power output line connector 4 | 1.8 | W | 1.8 | W |
| Exemplary fixed heating element length, line connector 4, defined by the tracking on the latter | 400 | mm | 400 | mm |
| Required power output on the media line (pipe line) | 12.5 | W/M | 12.5 | W/M |
| Exemplary pipe diameter of the media line | 4.05 | mm | 4.05 | mm |
| Exemplary nominal operating voltage, voltage | 13.5 | V | 13.5 | V |
| Exemplary media line length | 4.700 | mm | 4.700 | mm |
| Basic line length for one meter | 1.000 | mm | 1.000 | mm |

Table 5a below cites the diameter of an inventive mixed stranded wire and its exemplary preferred cross-sectional area.

TABLE 5a

| Diameter of the mixed stranded wires | 1.10 | mm |
| Preferred reduced cross-sectional area | 0.20 | mm$^2$ |

From Tables 5 and 5a ensue the following values reproduced in Tables 6 to 6f and subsequently explained in more detail, wherein the values contained in Table 6 apply to the Variants I and II from Tables 5 and 5a, the values contained in Table 6a apply to Variant 1, the values contained in Table 6b apply to Variant II, the values contained in Table 6c apply to Variant 1, the values contained in Table 6d apply to Variant II, the values contained in Table 6e apply to Variant I, and the values contained in Table 6f apply to Variant II.

TABLE 6

| Required heating element power output for line connector 3 | 3 | W/m | Results from power on line connector 3 and length of line connector 3 |
| Required heating element power output for line connector 4 | 4.5 | W/m | Results from power on line connector 4 and length of line connector 4 |
| Necessary quantity per heating element on the media line | 1.67 | M | Results from the requirement media line power output/power output of the two stranded wires or heating element portions |
| Pitch of the heating elements on the pipe line/media line | 12 | mm | Results from the length 1,000 m, the necessary heating element length on a meter media line and the diameters for media line and heating element |
| Total quantity of the first heating element to be used on the line connector 3 (QC1) | 8,233 | mm | Quantity of the heating element for the media line length + length at QC1 |
| Total quantity of the first heating element to be used on the line connector 4 (QC2) | 8,233 | mm | Quantity of the heating element for the media line length + length at QC2 |
| Power output to be generated with the first heating element | 25 |  | Length of the first heating element x power on this heating element |
| Power output to be generated with the second heating element | 37 |  | Length of the second heating element x power on this heating element |
| Total power output generated | 61.8 | W | Sum of the two Heating element power outputs |
| Required current | 4.57 | A | Power output/voltage |
| Resistance to be generated by first heating element | 1.18 | Ohm | $I = P/I^2$ |
| Resistance to be generated by second heating element | 1.77 | Ohm | $I = P/I^2$ |
| Total resistance | 2.95 | Ohm | Media line resistance generated by both heating elements |

TABLE 6a

| | | | |
|---|---|---|---|
| Required specific heating element resistance 1 | 0.143 | Ohm/m | Results from the resistance of the first heating element and the quantity to be used |
| Required specific heating element resistance 2 | 0.215 | Ohm/m | Results from the resistance of the second heating element and the quantity to be used |

TABLE 6b

| | | | |
|---|---|---|---|
| Required specific heating element resistance 1 | 0.215 | Ohm/m | Results from the resistance of the first heating element and the quantity to be used |
| Required specific heating element resistance 2 | 0.358 | Ohm/m | Results from the resistance of the second heating element and the quantity to be used |

TABLE 6c

| | | | | |
|---|---|---|---|---|
| Possible cross-sectional area for first heating element | 0.119 | mm$^2$ | with | Cu | Made from only one material |
| Possible cross-sectional area for first heating element | 0.174 | mm$^2$ | with | CuNi 1 | Made from only one material |
| Possible cross-sectional area for first heating element | 0.349 | mm$^2$ | with | CuNi 2 | Made from only one material |
| Possible cross-sectional area for second heating element | 0.116 | mm$^2$ | with | CuNi 1 | Made from only one material |
| Possible cross-sectional area for second heating element | 0.232 | mm$^2$ | with | CuNi 2 | Made from only one material |
| Possible cross-sectional area for second heating element | 0.465 | mm$^2$ | with | CuNi 6 | Made from only one material |

TABLE 6d

| | | | | | |
|---|---|---|---|---|---|
| Possible cross-sectional area for first heating element | 0.116 | mm$^2$ | with | CuNi 1 | Made from only one material |
| Possible cross-sectional area for first heating element | 0.232 | mm$^2$ | with | CuNi 2 | Made from only one material |
| Possible cross-sectional area for first heating element | 0.465 | mm$^2$ | with | CuNi 6 | Made from only one material |
| Possible cross-sectional area for second heating element | 0.139 | mm$^2$ | with | CuNi 2 | Made from only one material |
| Possible cross-sectional area for second heating element | 0.279 | mm$^2$ | with | CuNi 6 | Made from only one material |
| Possible cross-sectional area for second heating element | 0.418 | mm$^2$ | with | CuNi 10 | Made from only one material |

TABLE 6e

| | | | |
|---|---|---|---|
| Resistance of the first heating element portion (stranded wire) with 0.20 mm$^2$ | 0.145 Ohm/m | with | 6xCuNi 1 1xCuNi 6 |
| Resistance of the second heating element portion (stranded wire) with 0.20 mm$^2$ | 0.218 Ohm/m | with | 4xCuNi 2 2xCuNi 1 1xCuNi 10 |

TABLE 6f

| | | | |
|---|---|---|---|
| Resistance of the first heating element portion (stranded wire) with 0.20 mm$^2$ | 0.218 Ohm/m | with | 4xCuNi 2 2xCuNi 1 1xCuNi 10 |
| Resistance of the second heating element portion (stranded wire) with 0.20 mm$^2$ | 0.358 Ohm/m | with | 4xCuNi 2 1xCuNi 6 1xCuNi 10 1xCuNi 15 |

Table 7 below gives the respective specific resistances of the materials cited in the above tables:

TABLE 7

| Materials/alloys | Material | Specific resistance [Ohm * mm$^2$/m] |
|---|---|---|
| | Cu | 0.017 |
| | CuNi 1 | 0.025 |
| | CuNi 2 | 0.050 |
| | CuNi6 | 0.100 |
| | CuNi 10 | 0.150 |
| | CuNi 15 | 0.210 |
| | CuNi 23 | 0.300 |
| | CuNi 30 | 0.400 |
| | CuNi 44 | 0.490 |
| | NiCr3020 | 1.040 |

The power $P_3$ required on the first line connector 3 is e.g. $P_3 = 1.2$ W. The exemplary fixed heating element portion length $l_3$ on the line connector 3, which is predetermined by the tracking in the rib structure on its outer surface, is $l_3$=400.00 mm. The power $P_4$ required on the second line connector 4 is e.g. $P_4$=1.8 W. The exemplary fixed heating element portion length $l_4$ on the line connector 4, which is predetermined by the tracking in the rib structure on its outer surface, is also $l_4$=400.00 mm. The power $P_2$ required on the pipe-type media line 2 is e.g. $P_2$=12.5 W/m, the media line diameter $d_2$ is e.g. $d_2$=4.05 mm. The exemplary nominal operating voltage U is U=13.5 V. The line length L is e.g. L=4,700 mm, the basic line length for one meter 1,000 mm.

The diameter $d_{50,51}$ of the heating element portions 50, 51 designed as mixed wire strands should be $d_{50,51}$=1.10 mm (=stranded wire diameter including insulation), and the preferred cross-sectional area $A_{50,51}$ of the latter is $A_{50,51}$=0.20 mm². The latter is the cross-sectional area of the metallic parts of the individual wires, that is to say, without their insulation sheathing.

From this, the (partial) heating element power $P_{50}$ for the first line connector 3 results from the power $P_3$ on the first line connector 3 to the length $l_3$ of the heating element portion 50 on the first line connector as $P_{50}$=3 W/m.

The (partial) heating element power $P_{51}$ for the second line connector 4 results from the power $P_4$ on the second line connector 4 relative to the length $l_4$ of the heating element portion on the second line connector 4 as $P_{51}$=4.5 W/m. The necessary length l per heating element portion on the media line 2 results from the ratio of the line power $P_2$ to the sum of the powers $P_{50}$, $P_{51}$ of the two heating element portions 50, 51 as l=1.67 m. The required pitch of the heating element portions 50, 51 on the pipe-type media line 2 ensues from the basic line length of 1,000 mm, the necessary length l per heating element portion on a metre line and the diameters $d_2$, $d_{50,51}$ of the pipe-type media line 2 and the heating element portions 50, 51 designed as mixed wire strands as s=12 mm. The total length to be used $L_{50ges}$ on heating element portion 50 (on the line connector 3) results from the length l on heating element portion 50 for the wrapping of the pipe-type media line 2, the length L of the line and the length $l_3$ on the line connector 3 as $L_{50ges}$=8,233 mm. The total length to be used $L_{51ges}$ on heating element portion 51 (on the line connector 4) results from the length l on heating element portion 51 for the wrapping of the pipe-type media line 2, the length L of the line and the length $l_4$ on the line connector 4 as $L_{51ges}$=8,233 mm.

The power $P_{50ges}$ to be generated with the heating element portion 50 results from the length $L_{50ges}$ on the heating element portion 50, multiplied by the power $P_{50}$ on heating element portion 50, as $P_{50ges}$=25 W. The power $P_{51ges}$ to be generated with the heating element portion 51 results from the length $L_{51ges}$ on the heating element portion 51, multiplied by the power $P_{51}$ on the heating element portion 51, as $P_{51ges}$=37 W. The total power of the two heating element portions 50, 51 results from the sum of the two powers $P_{50ges}$ and $P_{51ges}$ as $P_{50,51ges}$=61.8 W. The required current I is thus I=4.57 A. From this, the resistance $R_{50}$ to be generated by the heating element portion 50 is calculated from the power $P_{50ges}$ relative to the square of the current I as $R_{50}$=1.18 Ω; the resistance $R_{51}$ to be generated by the heating element portion 51 is calculated from the power $P_{51ges}$ relative to the square of the current I as $R_{51}$=1.77 Ω. The sum of the resistances $R_{50}$ and $R_{51}$ is thus $R_{50,51}$=2.95 Ω. The required resistance per unit length $R_{L50}$ of the heating element portion 50 results from the resistance $R_{50}$ and the heating element portion length to be used $L_{50ges}$ as $R_{L50}$=0.143 Ω/m. The required resistance per unit length $R_{L51}$ of the heating element portion 51 results from the resistance $R_{51}$ and the heating element portion length to be used $L_{51ges}$ as $R_{L51}$=0.215 Ω/m.

This would result in a possible cross-sectional area A50 for the heating element portion 50 of $A_{50}$=0.119 mm², if this were to consist of only one material, here Cu, or $A_{50}$=0.174 mm², if this were to consist of only one material, here CuNi1, or $A_{50}$=0.349 mm², if this were to consist of only one material, here CuNi2. This would result in a possible cross-sectional area $A_{51}$ for the heating element portion 51 of $A_{51}$=0.116 mm², if this were to consist of only one material, here CuNi1, or $A_{51}$=0.232 mm², if this were to consist of only one material, here CuNi2, or $A_{51}$=0.465 mm², if this were to consist of only one material, here CuNi6. The first and second design for the first heating element portion 50 would thus be too small, and the third would mean too high a material consumption. For the second heating element portion 51, the first design would be too small, the two last-cited designs, or at least the latter design, would lead to too high a material consumption and thus to increased costs. In addition, the outer diameter including insulation would possibly be too large, so that insertion into a tight protective covering, such as a narrow insulation tube, e.g. a corrugated tube, would not be possible, and therefore a larger protective covering diameter or corrugated tube diameter would possibly have to be used.

The two heating element portions 50, 51 are therefore designed in accordance with the invention as mixed wire strands. Here, the resistance per unit length $R_{50/20}$ of the heating element portion 50 with a cross-sectional area of $A_{50}$=0.20 mm² is, for example, $R_{50/20}$=0.145 Ω/m when using seven twisted individual wires, of which six consist of CuNi1 and one consists of CuNi6. The resistance per unit length $R_{51/20}$ of the heating element portion 51, designed as a mixed wire strand, with a cross-sectional area of $A_{51}$=0.20 mm² is, for example, $R_{51/20}$=0.218 Ω/m when using seven twisted individual wires, of which four consist of CuNi2, two consist of CuNi1, and one consists of CuNi10. Needless to say, other material combinations of the individual wires are possible for purposes of achieving a heating element portion with a desired specific resistance, with a predetermined cross-sectional area of the heating element portion. In particular, copper-zinc alloys or copper-tin alloys can be used here for one or more of the individual wires. In the case of seven individual wires, each with an outer diameter of the metallic part, that is to say, without insulation sheathing, of 0.19 mm, there ensues a cross-sectional area of $0.19^2$*pi/4=0.028 mm² per individual wire, that is to say, a total cross-sectional area of the mixed wire strand of 0.028 mm²×7=0.2 mm². Thus, with a predefined or predefinable cross-sectional area or cross-section of the heating element portion of, for example, 0.2 mm² of the two heating element portions to be connected, it is possible to select, or configure, a desired resistance by a suitable selection of the individual wires of the mixture of individual wires.

By using a mixed wire strand as a heating element portion and the appropriate connection in series of at least two heating element portions to form a pre-fabricated heating element, it is thus possible to adjust the total resistance of the latter such that the heat output over the extent of the pre-fabricated heatable media line can be optimally adjusted for a specific application, thus, in particular, in the zones in which only a small heat output is required, only such is provided, whereas in the zones where a high heat output is required to thaw out a frozen medium in the pre-fabricated heatable media line, or to prevent a medium from freezing, a suitably high heat output is provided.

In addition to the embodiment variants of pre-fabricated heatable media lines and pre-fabricated heating elements cited above and shown in the figures, numerous other combinations can be provided, also any combinations of the features cited, wherein at least one pipe-type and/or hose-type media line, at least one line connector arranged at the end of the latter, and at least one pre-fabricated heating element are provided, which comprises at least two heating element portions, which are connected in at least one circuit, wherein at least one of the heating element portions is formed as a mixed wire, which has a number of twisted individual wires, consisting of at least two different materials.

LIST OF REFERENCE SYMBOLS

1 Pre-fabricated heatable media line
2 Pipe-type media line
3 Line connector
4 Line connector
5 Pre-fabricated heating element
6 Electrical supply line
7 Electrical supply line
20 Transition region/area
21 Transition region/area
22 Line wall
23 Fixing tape
30 Groove
31 Rib
32 Rib
50 Heating element portion 51 Heating element portion
52 Connection point/crimping point
53 End of 50
54 End of 51
55 End of 5056 End of 51
57 Connection point/crimping point
58 Heating element portion
59 Heating element portion
123 Film element
150 High tensile strength support element/high tensile strength core
151 Individual wire
152 Individual wire
153 Individual wire
154 Individual wire
155 Individual wire
156 Individual wire
157 Individual wire
158 Protective sheath
580 End of 58
581 End of 58
590 End of 59
591 End of 59
$l_s$ Lay length
$d_5$ Outer diameter of 5
$d_{5a}$ Outer diameter of 5
$d_{5b}$ Outer diameter of 5

What is claimed is:

1. A pre-fabricated heatable media line, comprising at least one pipe-type and/or hose-type media line, at least one-line connector arranged at an end of the latter, and with at least one pre-fabricated heating element,
    wherein the pre-fabricated heating element comprises at least two series-connected heating element portions, which are connected in at least one circuit, and at least one of the heating element portions extends over at least one part of the at least one line connector and the at least one pipe-type and/or hose-type media line, for purposes of heating the at least one part of the line connector and the at least one pipe-type and/or hose-type media line,
    wherein at least one of the heating element portions is designed as a mixed wire strand, which has a number of twisted individual wires, consisting of at least two different materials; and
    wherein the at least one heating element portion designed as the mixed wire strand has a cross-sectional area of 0.15 to 0.37 mm$^2$.

2. The pre-fabricated heatable media line according to claim 1, wherein two heating element portions that are connected together both have the same cross-sectional areas.

3. The pre-fabricated heatable media line according to claim 1, wherein two interconnected heating element portions each have a minimum cross-sectional area of 0.15 mm$^2$.

4. The pre-fabricated heatable media line according to claim 3, wherein the two interconnected heating element portions each have a minimum cross-sectional area of 0.2 mm$^2$.

5. The pre-fabricated heatable media line according to claim 1, wherein the at least one pipe-type and/or hose-type media line and the at least one line connector are adaptively wrapped with the at least one pre-fabricated heating element.

6. The pre-fabricated heatable media line according to claim 1, wherein at least one of the twisted individual wires of the at least one heating element portion consists of a copper-zinc alloy, or a copper-tin alloy.

7. The pre-fabricated heatable media line according to claim 1, wherein the pre-fabricated heating element comprises two or three heating element portions.

8. The pre-fabricated heatable media line according to claim 1, wherein the at least one heating element portion designed as a mixing strand comprises seven twisted individual wires.

9. The pre-fabricated heatable media line according to claim 1, wherein with the twisting of the individual wires to form the at least one heating element portion the lay length ($l_s$) is 6 to 15 mm.

10. The pre-fabricated heating element according to claim 9, wherein with the twisting of the individual wires to form the at least one heating element portion the lay length ($l_s$) is 9 mm.

11. A method for fixation of at least one pre-fabricated heating element according to claim 1, onto a media line for purposes of forming a heatable media line, comprising the steps of:
    Providing the at least one pipe-type and/or hose-type media line with the at least one pre-fabricated heating element, and the at least one pre-fabricated heating element, by means of at least partially wrapping around of the media line, provided with the latter, with at least one film element, are fixed on the latter, and
    heating the media line provided with the at least one pre-fabricated heating element, and the at least one film element for purposes of better embedding of the pre-fabricated heating element in the film element, and better placement of the latter on the outer surface of the media line.

12. The method in according to claim 11,
    wherein the at least one film element is stretched, and/or overextended, and/or plastically deformed, during the winding of the media line with the at least one heating element arranged on the latter.

13. The pre-fabricated heating element according to claim 1, wherein the at least one heating element portion designed as the mixed wire strand has a cross-sectional area of 0.17 to 0.23 mm$^2$.

14. The pre-fabricated heating element according to claim 13, wherein the at least one heating element portion designed as the mixed wire strand has a cross-sectional area of 0.20 mm$^2$.

* * * * *